March 19, 1968   JIN TAKAHASHI   3,373,708
DRIVE MOTOR MOUNTING ARRANGEMENT
Filed Aug. 17, 1966   2 Sheets-Sheet 1
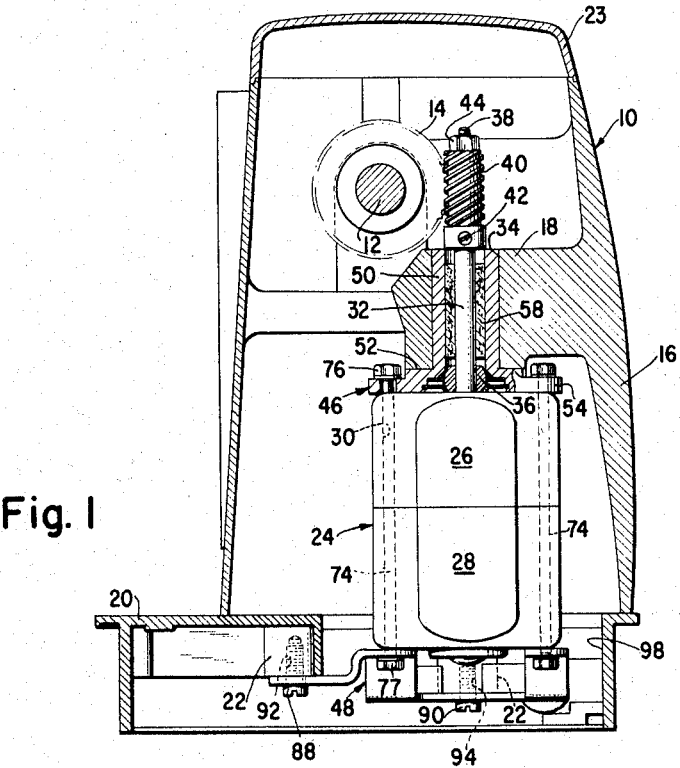
Fig. 1
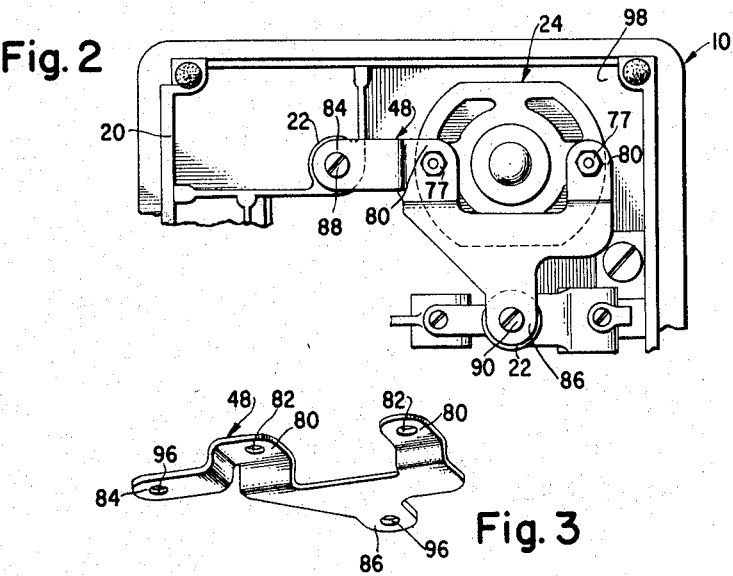
Fig. 2
Fig. 3
INVENTOR.
Jin Takahashi
BY
Marshall J. Breen
ATTORNEY
WITNESS:
Heidi Schlechauf

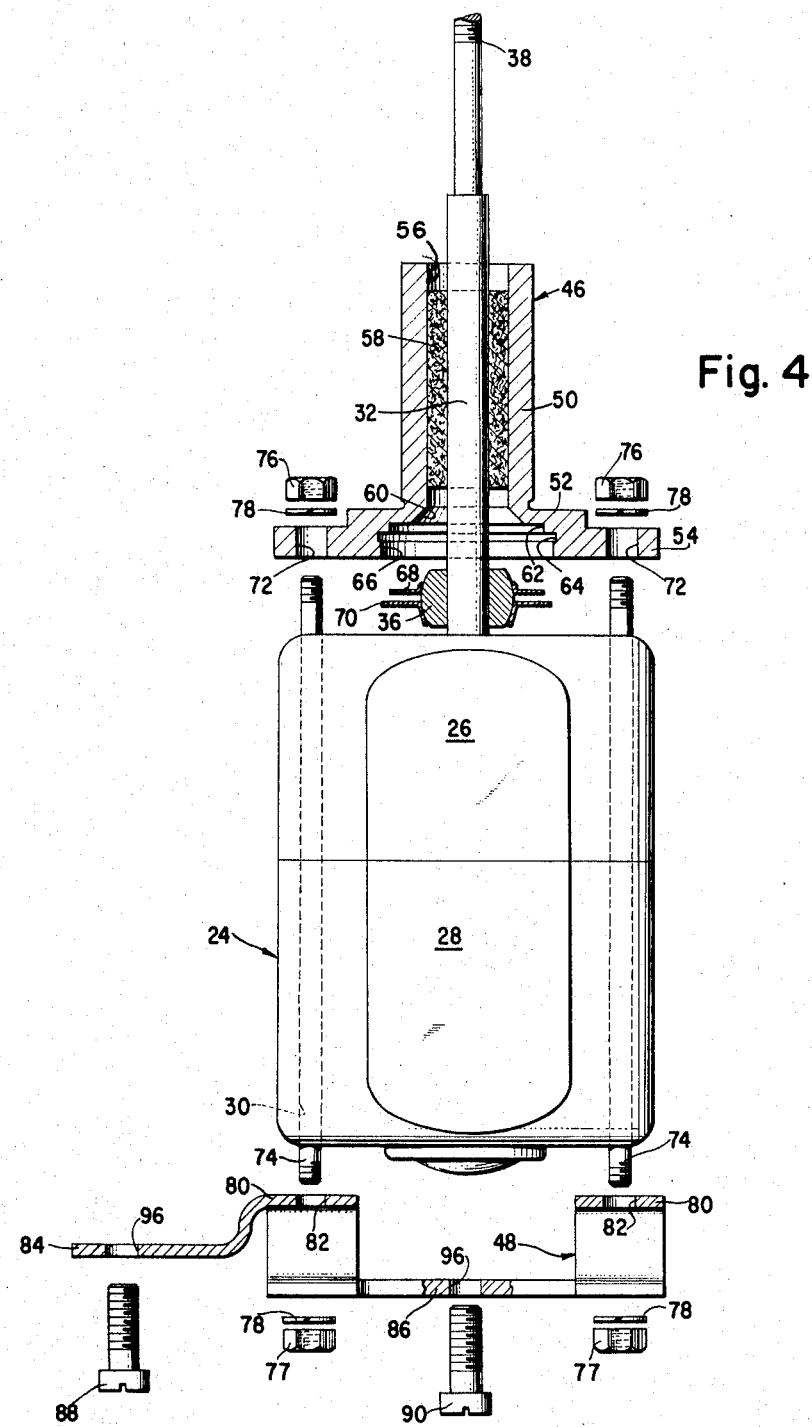

United States Patent Office

3,373,708
Patented Mar. 19, 1968

3,373,708
DRIVE MOTOR MOUNTING ARRANGEMENT
Jin Takahashi, Kaminokawa, Tochigi-ken, Japan, assignor to The Singer Company, New York, N.Y., a corporation of New Jersey
Filed Aug. 17, 1966, Ser. No. 573,027
Claims priority, application Japan, Sept. 1, 1965, 40/71,283
3 Claims. (Cl. 112—220)

This invention relates to means for removably mounting an electric motor for gear drive within the frame of a sewing machine and more especially relates to structural features that allow a final, fine gear adjustment within the machine.

In the sewing machine industry today, high quality family machines invariably utilize built-in electric motors with gear drives. However, today's complex sewing machines provide for an increased range of sewing operations which require additional elements that reduce the space available for the inclusion of such electric motors. Furthermore, the present trend towards more streamlined sewing machines additionally reduces the space available within the machine casing. The reduced available space increases the difficulty of properly mounting the electric motor within the machine.

When utilizing electric motors of the kind contemplated by the present invention, it is essential that a proper mesh be made between the driving electric motor gear and the driven arm shaft gear. However, tolerances introduced in the manufacture of the electric motor, including the gear and its shaft, the sewing machine arm shaft and its meshing gear and the formation in the sewing machine frame of the various bores and bolt holes utilized for the support of these parts and units militate against attainment of precise alignment of the gears simply by bolting the motor to the frame. What is required properly to align the gears is a final, fine adjustment that may be made after the motor has been mounted in the frame when it is possible to observe the meshing of the gears.

It is an object of this invention, therefore, to provide simple means for readily mounting an electric motor with a gear drive within a limited space in the sewing machine frame.

It is another object of this invention to provide improved adjustment means for properly meshing the electric motor driving gear with that of the sewing machine arm shaft driven gear.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

FIG. 1 is a vertical transverse sectional view of a sewing machine showing the electric motor and its support structure which is the subject of this invention, FIG. 2 is a bottom view, broken away, of the sewing machine shown in FIG. 1, FIG. 3 is a perspective view of the removable clamp bracket, and FIG. 4 is an exploded view of the support elements for the electric motor.

Referring now to the drawings there is shown a sewing machine frame 10 in which there is journaled an arm shaft 12 to which is secured a gear 14. The frame 10 includes a conventional upright standard 16 having an upper apertured support lug 18 that extends inwardly of the inner wall of the standard, and a bed 20 formed with depending bosses 22. A conventional removable cover 23 provides for access to the inside of the machine through the top of the frame.

An electric driving motor 24, including housings 26 and 28 formed with long bolt apertures 30, is mounted in a vertical position within the upright standard 16, as seen in FIG. 1. The motor 24 includes a spindle 32 which, when the motor is mounted, extends upwardly through a bore 34 formed in the lug 18 of the standard 16. The spindle 32 rides in a bearing at each end of the motor, one of which is self aligning bearing 36 shown in FIGS. 1 and 4. Mounted on the reduced diameter end segment 38 of the spindle 32 is a worm 40 secured to the spindle by a set screw 42 and a nut 44. When the motor 24 is installed as shown in FIG. 1 the worm 40 and spindle 32 must be aligned so that the worm 40 and gear 14 are properly meshed.

The electric driving motor is mounted by sandwiching it between an upper bracket 46 and a lower bracket 48 and securing the lower bracket to the bed 20 of the sewing machine. The upper bracket 46 is hollow and substantially cylindrical and is formed with an elongated collar 50 having a flange 52 at its lower end, the flange in turn being formed with a pair of apertured ears 54. The elongated collar 50 is received in a snug fit by the bore 34 in the lug 18. The elongated collar 50 is formed with a bore 56 adapted to receive the spindle 32, which is encompassed within the bore 56 by a portion of felt material 58, in a loose fit. The lower end of the bore 56 opens into a series of four concentric counterbores 60, 62, 64, and 66 formed in the flange 52, which are adapted to receive the self aligning bearing 36 and its support bushings 68 and 70, as seen in FIG. 4. The ears 54 are formed with bolt holes 72 which are diametrically enlarged beyond what would be normally required to accept the long-bolts 74, for a purpose to be explained below. The ends of the long-bolts 74 are threadedly engaged by nuts 76 which sandwich washers 78 between them and the brackets 46 and 48.

The lower bracket 48, as best seen in the perspective view of FIG. 3, is substantially flat but includes a pair of raised ears 80 formed with bolt holes 82 which are diametrically enlarged beyond what would normally be required to accept the long-bolts 74. An apertured support ear 84 along with an apertured support ear 86 serve to secure the bracket to the bed 20 by means of bolts 88 and 90 which, respectively, engage the threaded apertures 92 and 94, respectively, in the bosses 22 depending from the underside of the bed through conventionally sized apertures 96 in the ears 84 and 86.

Before the motor 24 is mounted within the sewing machine the upper and lower brackets 46 and 48 are assembled with and secured to the motor by the long-bolts 74 and their mating nuts 76 and 77. The assembler may then very conveniently insert the motor unit into the machine through an opening 98 in the bottom of the machine with the elongated collar 50 of the bracket 46 following the worm 40 through the bore 34 in the lug 18 until the top surface of the flange 52 is brought up against the undersurface of the lug. At this point the assembler should tighten the bolts 88 and 90 thereby securing the motor unit in place within the machine.

However, due to the ordinary tolerances associated with the manufacture of the various elements such as the motor spindle 32, the worm 40, the brackets 46 and 48 etc., and the casting of the frame 10 itself, it is unlikely that the worm 40 and the gear 14 will mesh properly merely by inserting the unit in the machine in a position determined by the bore 34 and the bolts 88 and 90. Thus, a further, final, fine adjustment properly to align the worm and gear must of necessity be provided for a machine of this type. The means for making such an adjustment must be economical and the adjustment itself must be convenient to make, accurate and capable of being completed quickly. The present invention satisfies all of these requirements. The lateral movement of the motor causes a slight pivotal movement of the shaft 32 about a pivot point defined by the bearing 36 and its support bushings 68 and 70. The compressability of the felt material 58 permits such adjustment.

The enlarged bolt holes 72 and 82 provide for limited movement of the motor in any lateral direction when the nuts 77 are loosened. The nuts 77 may be easily reached through the opening 98 in the bottom of the machine. The nuts 77 may then be quickly and conveniently loosened to allow the assembler manually to slide the motor in whatever lateral direction that is required properly to mesh the worm 40 with the gear 14. The operator may visually gauge the meshing of the worm and gear by removing cover 23 from the machine. When the worm and gear are aligned to the assembler's satisfaction he may then tighten the nuts 77 thereby securing the motor and the worm in the desired final position. It is noted that the fact that the motor and the brackets may be assembled before mounting adds considerably to the ease of installation by obviating the necessity for manipulating loose brackets. Further, the initial step of securing the lower bracket 48 to the machine frame frees the assembler's hands so that he may use them to make the final adjustment of the motor.

What is claimed herein is:

1. In a sewing machine having a frame, an electric drive motor including a housing mounted within said frame, a drive shaft journaled in said frame, a gear secured to said drive shaft, said motor including a spindle and a worm secured to the free end segment of the spindle, said worm being adapted to mesh with the drive shaft gear, means for adjustably mounting the motor on said frame, said means including a pair of bolts extending through the housing of said motor, a first bracket and a second bracket, means for utilizing said bolts releasably to clamp said first bracket to one end of said motor and said second bracket to the opposite end of the motor, means for securing said first bracket to said sewing machine frame, said means for connecting said brackets to said motor including apertures formed in said brackets and adapted to receive said bolts, said apertures being enlarged to allow lateral movement of the bolts within the apertures thereby to allow lateral movement of the motor and attached worm which provides for adjustment of said worm relatively to said drive shaft gear.

2. Adjustable means for removably mounting an electric drive motor, having a spindle and a worm secured to the free end segment of the spindle, within the frame of a sewing machine including a drive shaft journaled in the frame and a gear secured to the shaft, comprising a first bracket and a second bracket mounted on opposite ends of the electric motor, a pair of bolts extending through the housing of the electric motor, said bolts being substantially parallel with the motor spindle, means for utilizing said bolts releasably to clamp the brackets to the electric motor, means for releasably securing at least one of said brackets to the sewing machine frame, said brackets being formed with apertures adapted to receive said bolts, said apertures being enlarged to allow lateral movement of the bolts within the apertures which provides for lateral movement of the electric motor thereby to permit adjustment of the worm relatively to the drive shaft gear.

3. In a sewing machine having a frame formed with a bed from one end of which rises a standard that carries a bracket arm, an electric drive motor including a housing mounted vertically within the standard, a drive shaft journaled in the bracket arm, a gear secured to said drive shaft above said electric motor, said electric motor including a spindle and a worm secured to the free end segment of said spindle, said worm being adapted to mesh with said gear, a pair of bolts extending through the housing of said electric motor parallel to said spindle, a first bracket mounted on the upper end of said electric motor, said first bracket formed with an elongated collar adapted to receive said spindle in a loose fit, and a flange at one end of the collar including a pair of oppositely disposed ears, each ear being formed with an aperture, said standard including a lug formed with a bore adapted to receive said elongated collar, a second bracket mounted on the lower end of the electric motor and formed with a pair of spaced ears, each ear being formed with an aperture, said second bracket being releasably secured to the underside of the bed of the sewing machine, the apertures of the ears of said first and second brackets being adapted to receive said bolts and being enlarged to provide for lateral movement of the bolts within the apertures, means for releasably clamping the brackets to the electric motor, said means including a pair of nuts threadedly engaging the lower end segment of said bolts, whereby the loosening of said nuts provides for lateral movement of the motor and spindle and secured worm thereby providing for meshing adjustment of the worm relatively to the gear.

References Cited
UNITED STATES PATENTS

| 1,955,605 | 4/1934 | Peterson | 248—16 |
| 2,617,375 | 11/1952 | Peets | 112—220 |
| 2,662,988 | 12/1953 | McKim | 310—91 |

FOREIGN PATENTS

| 514,035 | 6/1955 | Canada. |

JORDAN FRANKLIN, *Primary Examiner.*

J. HAMPTON HUNTER, *Examiner.*